May 7, 1968 R. A. DISCHERT 3,382,375

COUNTER EMPLOYING MONOSTABLE-MULTIVIBRATOR WITH ITS TIMING CYCLE DETERMINED AND INITIATED BY FIRST TWO PULSES OF INPUT CLOCK BUT THEN ISOLATED THEREFROM FOR REMAINDER OF COUNT

Filed April 3, 1964 2 Sheets-Sheet 1

INVENTOR.
ROBERT A. DISCHERT
BY
W. H. Sprouagle
Attorney

COUNTER EMPLOYING MONOSTABLE-MULTIVIBRATOR WITH ITS TIMING CYCLE DETERMINED AND INITIATED BY FIRST TWO PULSES OF INPUT CLOCK BUT THEN ISOLATED THEREFROM FOR REMAINDER OF COUNT

Filed April 3, 1964 2 Sheets-Sheet 2

INVENTOR.
ROBERT A. DISCHERT
BY
W. H. Spouagle
Attorney

United States Patent Office 3,382,375
Patented May 7, 1968

3,382,375

COUNTER EMPLOYING MONOSTABLE-MULTIVIBRATOR WITH ITS TIMING CYCLE DETERMINED AND INITIATED BY FIRST TWO PULSES OF INPUT CLOCK BUT THEN ISOLATED THEREFROM FOR REMAINDER OF COUNT

Robert A. Dischert Burlington, N.J., assignor to Radio Corporation of America, a corporation of Delaware
Filed Apr. 3, 1964, Ser. No. 357,026
7 Claims. (Cl. 307—225)

This invention relates generally to counter circuits, and particularly to novel counter circuits of a form advantageous for use in performing frequency dividing functions in a television synchronizing signal generator.

Electronic counter circuits are subject to a wide variety of uses. One particular form of equipment in which significant use can be made of pulse counter circuits is the equipment used to generate deflection synchronizing signals in a television system. In a television signal conforming, for example, to the monochrome broadcast signal standards established by the FCC, synchronizing pulses at both the field frequency (60 cycles per second) and line frequency (15,750 cycles per second) must be present. To assure achievement of line interlace, a particular phase relationship between the pulse trains of field and line frequencies must be maintained. Appropriate to these goals, a widely used approach to the generation of the field and line frequency synchronizing pulses involves use of an oscillator operating at twice the line frequency (i.e., 31.5 kc.); the output of this "master" oscillator is (a) frequency divided by a factor of two in effecting development of the line frequency synchronizing pulses, and (b) is frequency divided by a factor of 525 in effecting development of the field frequency synchronizing pulses. A chain of cascaded counter circuits are quite suitable for performing the latter frequency dividing function.

In counter circuits used for such purposes, stability of counter action in the face of parameter variations is a highly desirable characteristic. That is, the counter desirably is insensitive to oscillator frequency drifts, supply voltage variations, and component value changes due to aging, temperature swings, etc.

The present invention is directed to a highly stable counter circuit, maintaining an accurate count despite wide variations in input frequency, supply voltage, temperature, component aging, etc. A circuit in accordance with the principles of the present invention relies upon the controlled charging and discharging of a capacitor to establish a desired count. Charging of the capacitor begun in response to a first input impulse is terminated upon reception of the next succeeding input pulse. The charging current is supplied by a first controlled current source, with the charging time directly determined by the input impulse repetition rate. Discharge of the capacitor, i.e., charging of the capaictor in the opposite direction, involves a second controlled current source; control of the source and the resistance in the discharge path is determinative of the discharge time. During the discharge operation, input impulses are blocked in such a manner as to preclude initiation of the capacitor charging action. When the capacitor has been discharged to a reference level, the input impulse block is removed, and the next input impulse following the block removal serves to initiate the charging action, recommencing the cycle.

In accordance with a particular embodiment of the present invention, a first, normally conducting transistor is cut off by input impulse application to initiate the capacitor charging action. Charging current is provided by a second transistor, normally held off by conduction of the first transistor. The next succeeding input impulse terminates the charging action by cutting off the second transistor, with the first transistor responding to such cut-off by returning to conduction. A normally conducting, gating diode, in the path of input impulse application to the first transistor is opened upon this occurrence and remains open until the capacitor has discharged to a reference level, such discharge being through a path incorporating the base-emitter path of the conducting first transistor. Input impulses occurring during this discharging action are precluded from causing cut-off of the first transistor. Once the capacitor has been discharged to the so-called reference level, the gating diode is returned to a conducting condition, whereby the next appearing input pulse following such return may reach the first transistor and recommence the cycle.

The nature of the circuitry generally described above is such that the capacitor charging and discharging currents are essentially determined by resistance values only, with all other parts having no direct effect on the count; this assures a high degree of stability for the count. Power supply variations affect both the charging current and the discharging current, such that the total charge-discharge time remains substantially constant in the face of such variations. A change in the value of the charged capacitor effects a change in both the charge and discharge rates, whereby the total charge-discharge time remains constant in the face of such a change. The circuit provides the same count for an extremely wide range of input frequencies; as the input frequency changes, the charging time changes, resulting, in turn, in a change in charge amplitude, the latter change resulting in a variation in discharge time such as to maintain the same count. With resistance values controlling the charging and discharging currents which are determinative of the count rate, the counting rate provided by a given counter circuit may be simply altered by the mere change of a resistance value. This facility is highly advantageous where the counter circuit forms part of a sync generator to be used for synchronizing signal generation under a multiplicity of signal standards. Illustratively, pursuant to an embodiment of the present invention a frequency divider chain operating to provide an overall frequency division of 525 (for a 525 line picture at a 60 cycle field rate) may be altered to provide a frequency division of 625 (for a 625 line picture at a 50 cycle field rate) by altering one resistance value in two of the stages of the counter chain.

A primary object of the present invention is to provide a novel and improved counter circuit.

A further object of the present invention is to provide a counter circuit capable of stably maintaining a selected count despite variations in input frequency, power supply voltage or other parameters.

Other objects and advantages of the present invention will be readily recognized by those skilled in the art upon a reading of the following detailed description and an inspection of the accompanying drawings, in which.

Figures 1, 2:
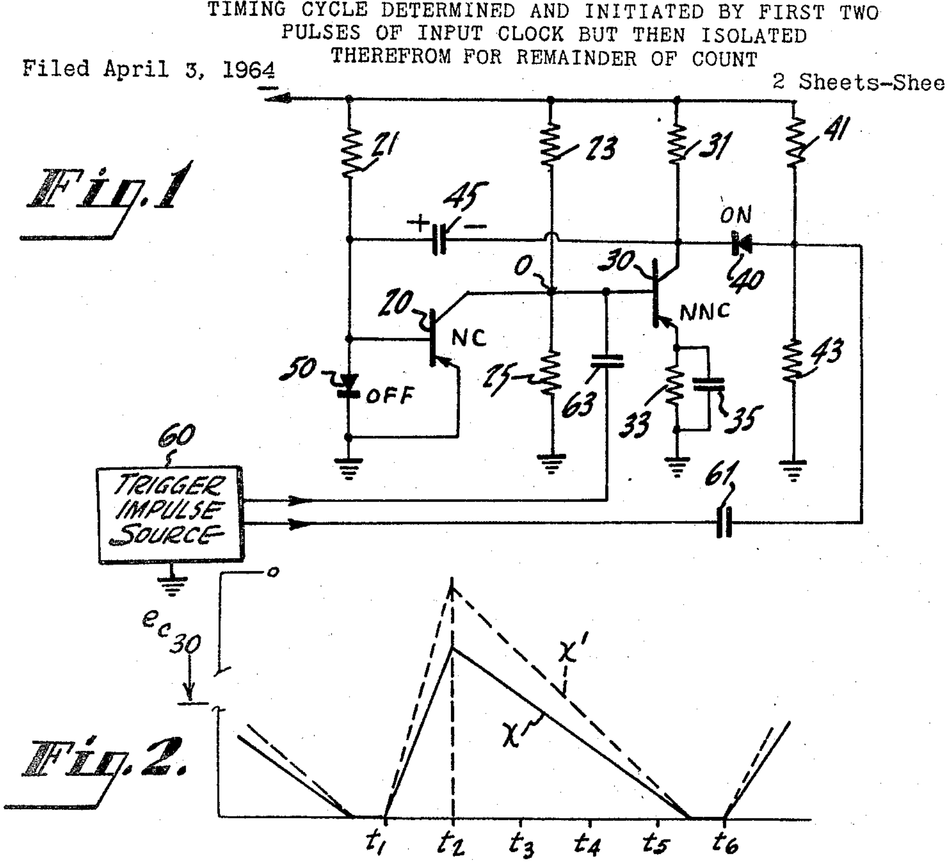
FIGURE 1 is a schematic diagram of a counter circuit embodying the principles of the present invention.
FIGURES 2 and 3 illustrate graphically voltage waveforms of aid in explaining the operation of the circuit of FIGURE 1.

In the schematically illustrated embodiment of FIGURE 1, a first transistor 20 (illustratively of the PNP type) has its emitter directly connected to chassis ground, and its collector connected to the junction of a pair of voltage divider resistors 23 and 25. The latter are connected in series between the negative terminal and positive (i.e., grounded) terminal of a D.C. operating potential source (not illustrated). Also connected to the junction of resistors 23 and 25 is the base of a second PNP transistor 30; the collector of transistor 30 is connected to the negative D.C. supply terminal via a resistor 31, while the emitter of transistor 30 is returned to ground by means of a resistor 33 (shunted by a capacitor 35).

A capacitor 45 is coupled between the collector of transistor 30 and the base of transistor 20. A resistor 21 is connected between the transistor 20 base and the negative supply terminal, while a semiconductor diode 50 links this base to ground, the base being connected to the anode electrode of the diode 50.

Positive-going trigger impulses are supplied by a source 60 to the transistor circuit via two paths. One path, leading to the collector of transistor 30, includes a capacitor 61 in series with a semiconductor diode 40, the cathode electrode of diode 40 connecting with the transistor 30 collector. Bias for the anode of diode 40 is provided by a voltage divider comprising resistors 41 and 43 connected in series across the operating potential supply, with the diode anode connected to the junction of the series resistors. The second triggering impulse path, which terminates at the base of transistor 30, consists of a coupling capacitor 63. The counter output terminal 0 is at the collector of transistor 20.

Quiescent biasing conditions are such that, in the absence of triggering impulses, transistor 20 is conducting heavily, and its conduction holds transistor 30 off. Under these conditions, diode 40 is conducting, diode 50 is biased off, and capacitor 45 is charged such that the plate connected to the resistor 21-diode 50 junction is always at ground potential while the other plate is at a fraction of the B— supply potential (determined by the voltage division ratio effected by voltage divider resistors 41, 43). The charge on capacitor 45 is shown by the polarity symbols in FIGURE 1.

In the descriptions that follow, it should be noted that for ease of description, alteration of charge on capacitor 45 (and its counterparts in subsequently described circuits) in a direction causing the collector of transistor 30 to go more positive will be referred to as a "charging" of the capacitor, and charge alteration in the opposite direction will be referred to as a "discharging" of the capacitor. One should recognize that this is use of these terms in their (often employed) broader sense, under which capacitor charge alteration in any given direction may be arbitrarily designated as charging, with recovery from such alteration designated as discharging. This caveat is presented since, for the particular circuit examples illustrated in the drawing, the description's use of these terms is not necessarily in consonance with their rigorous sense (i.e., that sense, under which only a charge alteration that reduces the differences between the potentials of the respective plates of the capacitor may be viewed as a "discharging").

These conditions of conduction and non-conduction are altered by an initial triggering pulse from source 60. While application of the positive-going pulse via the capacitor 63 path to the transistor 30 base has no effect (since transistor 30 is already off), the pulse application via capacitor 61 does produce an effect, viz., the pulse is passed via conducting diode 40 and capacitor 45 to the base of transistor 20, driving saturated transistor 20 to cut-off after a slight delay due to sweeping out the minority charge carriers from the base-emitter junction. As transistor 20 ceases conduction, the base of transistor 30 drops to a level (just subsequent to the arrival of a trigger pulse via capacitor 63), determined by the ratio of voltage divider resistors 23 and 25, that permits transistor 30 to conduct.

With transistor 30 conducting, the voltage at its collector rises in a positive direction. The positive swing of the transistor 30 collector drives diode 40 off, but turns diode 50 on, with conduction of the latter diode holding transistor 20 off. A charge is built up on capacitor 45, the charging path comprising the conducting transistor 30 in series with its emitter resistor 33 and the conducting diode 50.

The rise of the transistor 30 collector potential and the charging of capacitor 45 continue until the appearance of the next trigger impulse from source 60. While the opening of diode 40 prevents the application of this positive-going trigger impulse to the base of transistor 20, the additional path provided by capacitor 63 permits application of the positive-going trigger impulse to the base of the conducting transistor 30. This trigger impulse drives transistor 30 off, and produces a negative going impulse at the base of transistor 20 that turns transistor 20 on and diode 50 off. The capacitor 45 now starts to discharge, the discharging path essentially consisting of the resistor 31 in series with the operating potential supply and the conducting base-emitter path of transistor 20.

It will be appreciated that selection of the value of resistor 31 will be primarily determinative of the discharge rate. Until the potential at the collector of transistor 30 drops down to the level established at the junction of voltage divider resistors 41 and 43, the gating diode 40 remains nonconducting, and triggering impulses appearing during this capacitor discharging interval have no effect on the counter circuit. That is, they are blocked from passage to the transistor 20 base by the nonconducting diode 40, and their application to the transistor 30 base via capacitor 63 has no effect since transistor 30 is already nonconducting during this discharging interval. Thus a particular number of successive triggering impulses (the number depending upon the discharge rate established through the choice of the resistor 31 value) are "ignored" by the counter circuit, until the voltage at the transistor 30 collector finally descends to a level permitting conduction of the gating diode 40. The collector potential remains substantially fixed at this level until the next succeeding triggering impulse appears and is coupled, via the once-again conducting diode 40 and capacitor 45, to the transistor 20 base. This causes cut-off of transistor 20 to recommence the cycle.

Waveform $x$ in FIGURE 2 is illustrative of the variations in the transistor 30 collector potential in the FIGURE 1 circuit. The ordinate in the graphic presentation of FIGURE 2 is the collector potential, while the abscissa is time, with $t_1$ designating the appearance of an initial triggering impulse causing cut-off of transistor 20, $t_2$ designating the time of appearance of the following trigger impulse, $t_3$ the time of appearance of the next succeeding impulse, etc.

As the waveform $x$ shows, the transistor 30 collector potential commences a rise in the positive direction at time $t_1$, the rise continuing until time $t_2$, when the next trigger impulse cuts off transistor 30. The discharge of capacitor 45 now begins, with the transistor 30 collector potential descending in a negative direction, at a slower rate than the rise rate. This descent continues until arrival at a base level, this arrival not occurring in the illustrative example shown until after the appearances of third, fourth and fifth triggering impulses at times $t_3$, $t_4$ and $t_5$. When the base level is finally reached, at a time intermediate the time $t_5$ and the time of appearance ($t_6$) of the next succeeding trigger impulse, the potential descent ceases, and the transistor 30 collector potential holds at the base level until time $t_6$. At the latter time, the potential begins to rise again as the cycle is recommenced.

FIGURE 2 is illustrative of the capacitor charging and discharging conditions prevailing when the counter circuit parameters are selected to provide a count of 5. It will be appreciated that under such conditions the counter provides one output impulse at terminal 0 in response to a succession of five input impulses. The output impulse is a positive-going pulse developed at the collector of transistor 20 due to cut-off of the latter during the $t_1$–$t_2$ time interval; such a positive-going pulse is not again developed until arrival at time $t_6$ when the counter cycle is recommenced. The repetition rate of the output pulses is thus one-fifth of the repetition rate of the input pulses.

Waveform $x'$ in FIGURE 2 is illustrative of the effect on the transistor 30 collector potential waveform of an increase in the operating D.C. potential. As shown, such a supply variation produces complementing changes in both the rising and descending portions of the waveform which result in no change in the total rise-descent time. This is simply explained by the following: a rise in the supply potential produces an increase in the amplitude of charge of capacitor 45 attained during the $t_1$–$t_2$ interval, but it does not effect a change in duration of the charging interval which is determined solely by the timing of the input impulses; this charge amplitude change results in a faster discharge rate, but the faster discharge is from a higher initial charge level whereby discharge down to the base level requires the same time interval as before (i.e., the discharging time interval remains essentially constant).

Waveform $x'$ in FIGURE 2 is also illustrative of the alterations in the transistor 30 collector potential waveform that would accompany a reduction in the capacitance value of capacitor 45, showing that such a parameter change would not alter the count provided by the circuit.

Figure 3:
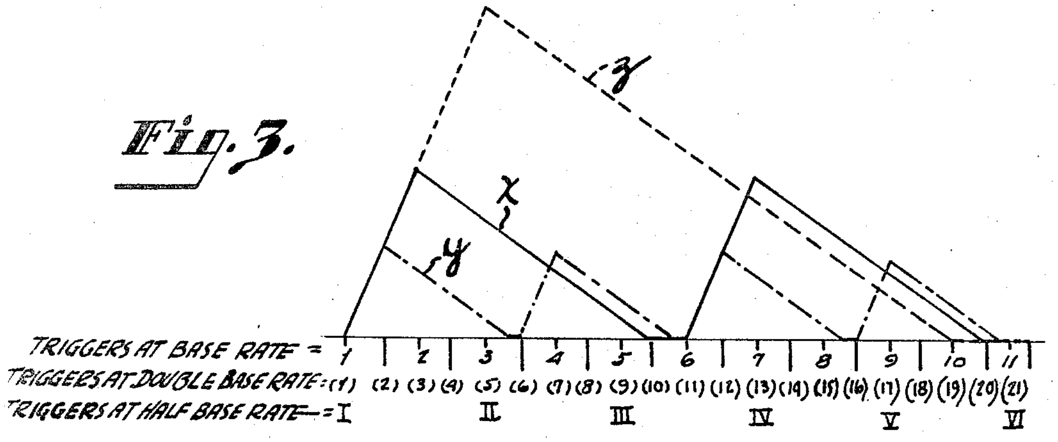

FIGURE 3 provides a graphic demonstration of the ability of the FIGURE 1 circuit to maintain a predetermined count in the face of wide variations in the repetition rate of the input impulses. The solid-line waveform $x$ of FIGURE 3 corresponds to the similarly designated waveform of FIGURE 2, and shows two full cycles of the potential variations at the transistor 30 collector, under conditions of periodic delivery of triggering impulses from source 60 at some predetermined "base" repetition rate, with the times of appearance of successive impulses at this base rate being represented by the abscissa legend using (unenclosed) arabic numerals. As in FIGURE 2, the waveform $x$ shows the transistor 30 collector potential under conditions where the desired "count" is five; i.e., where the output pulse repetition rate is one-fifth of the input pulse repetition rate. During the time interval shown in FIGURE 3, the counter circuit of FIGURE 1 has developed two output pulses at terminal 0 in response to the application of ten base rate triggering impulses from source 60, and is ready to begin a new cycle of operation in response to the eleventh.

Waveform $y$ in FIGURE 3 is illustrative of the altered waveshape that would be developed at the transistor 30 collector should the repetition rate of the input impulses increase to double the base rate. The abscissa legend using arabic numerals in parentheses represents the times of occurrence of the successive triggering impulses under such double base rate conditions.

Analysis of waveform $y$ shows that the FIGURE 1 circuit undergoes four full cycles of operation in the time interval illustrated in FIGURE 3 when triggered by double base rate impulses; accordingly, four output pulses are developed at terminal 0 in response to the application of twenty double base rate triggering impulses, and the counter is poised to commence a new cycle of operation in response to the twenty-first. Thus, the desired count of five is maintained despite a 2-to-1 upward shift in input frequency.

Explanation of this count maintenance is relatively simple: with the doubled input frequency, the capacitor charging time (always equal to one inter-pulse interval) is halved, but a concomitant of this reduced charging time is a reduction in the charge amplitude existing at the initiaton of capacitor discharge; with the ratio of RC time constants for the respective charging and discharging circuits remaining unchanged, the time required to discharge the capacitor from the lowered peak amplitude to the fixed level at which diode 40 resumes conduction is also halved. Thus, with the faster repetition of input impulses, an appropriate speeding up of charge and discharge operations occurs to ensure completion of the counter cycle after the same, selected number of input pulse appearances.

Waveform $z$ is presented in FIGURE 3 to show that a similar count maintenance result is obtained when the input rate is slower than the base rate. The triggering impulse rate associated with waveform $z$ is half the base rate, and the abscissa legend using roman numerals represents the times of appearance of the successive triggering impulses under such half base rate conditions.

As waveform $z$ shows, the FIGURE 1 circuit undergoes one full cycle of operation in the time interval illustrated in FIGURE 3 when triggered by half base rate impulses; accordingly, one output impulse is developed at terminal 0 in response to the application of five half base rate triggering impulses, and the counter is in condition for initiating a new cycle in response to the sixth. Thus, the desired count of five is retained in the face of a 2-to-1 downward shift in input frequency. Though the charging time is doubled under the half base rate conditions, it is accompanied by a corresponding doubling of the discharge time, ensuring counter cycle completion after the same, selected number of input pulse appearances.

Figure 4:
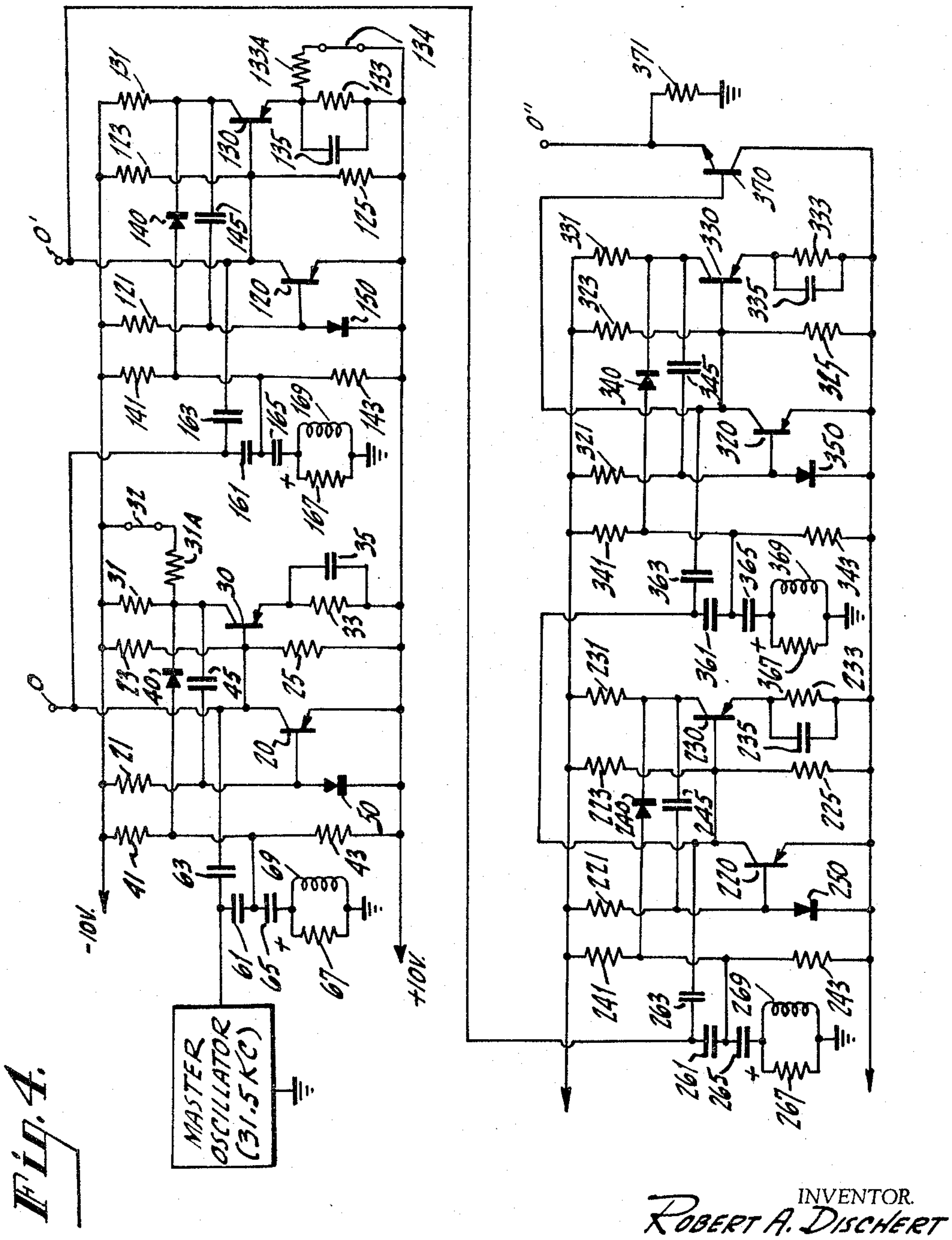
FIGURE 4 illustrates a portion of a television sync signal generator, showing in schematic detail a frequency divider chain incorporating a plurality of counter stages practicing the principles of the present invention.

FIGURE 4 illustrates a portion of a television synchronizing signal generator comprising a four-stage frequency divider chain, serving to develop a 60 c.p.s. pulse output (at final output terminal 0'') in response to input impulses from a 31.5 kc. master oscillator. Each of the four cascaded stages of the frequency divider comprises a counter circuit embodying the principles of the present invention and generally corresponding in form to the circuit of FIGURE 1. The overall division factor of 525 is illustratively obtained by arranging the successive stages to provide respective counts of 3, 7, 5 and 5. Assignment of these particular frequency division ratios to the respective stages proves convenient in permitting derivation of 10.5 kc. and 1.5 kc. pulse trains from respective intermediate output terminals 0 (first stage output) and 0' (second stage output) for use elsewhere in the sync signal generator for purposes that need not be discussed herein.

Elements in the first stage of the frequency divider of FIGURE 4 having counterparts in the FIGURE 1 circuit have been given the same reference numeral designations as the corresponding elements in FIGURE 1. A similar numbering system has been followed for the succeeding stages, but with the reference numerals elevated to the one hundreds in the second stage, to the two hundreds in the third stage, and to the three hundreds in the fourth stage.

Additional structure shown in connection with the first divider stage of FIGURE 4, but not shown in FIGURE 1, includes a network comprising an electrolytic capacitor 65 in series with the parallel combination of a resistor 67 and an inductance coil 69; this additional network is coupled between the junction of voltage divider resistors 41 and 43 (that serve to bias the anode of diode 40) and chassis ground. The values of the network elements are proportioned to provide the network with a frequency response characteristic of a selective character: viz., such that the network appears as an adequately high impedance at the frequency of the input triggering impulses fed to the junction point via capacitor 61 (and, particularly, at the frequency associated with their rising edges), but presents a relatively low impedance to the waveform $x$. Each of the succeeding stages of the frequency divider of FIGURE 4 is provided with a corresponding network of corresponding function.

Resistors 25, 33, and 43, diode 50, and the transistor 20 emitter are all returned to a point of positive DC potential in FIGURE 4, whereas their counterparts in FIGURE 1 are returned to ground. While this change alters the absolute DC levels at various points in the counter circuit, it does not alter the manner of operation, and the explanation given above for the operation of the FIGURE 1 circuit is equally applicable to the first and all succeeding stages of the frequency divider chain of FIGURE 4. The final stage of the divider supplies its output to an emitter follower driver stage comprising an NPN transistor 370 with its base directly connected to the collector of transistor 320, its collector connected to the positive DC supply terminal, and its emitter connected to ground via a resistor 371.

The waveform *x* of FIGURE 2 is directly representative of the capacitor charging and discharging action taking place in each of the third and fourth divider stages (each of which illustratively provides a count of 5). The waveforms associated with the first and second stages will differ, in that, for the former, discharge to base level will terminate intermediate the third and fourth triggering impulse (to provide the count of 3 desired for this stage), while, for the latter, discharge to base level will terminate intermediate the seventh and eighth triggering impulse (to provide the count of 7 desired for the latter stage).

Additional elements in FIGURE 4 that have not been discussed heretofore are resistors 31A and 133A. Per the circuit connections shown in solid lines in FIGURE 4, these resistors are in-circuit and play a part in the operation of the FIGURE 4 circuit to provide the illustrative total count of 525 (3×7×5×5). Resistor 31A is connected, via jumper 32, in shunt with the resistor 31 of the first counter stage; it is thus the parallel combination of resistors 31 and 31A that is primarily determinative of the discharging current for capacitor 45. Resistor 133A is connected, via jumper 134, in shunt with the resistor 133 of the second counter stage; it is the parallel combination of resistors 133 and 133A that is a prime determinant (along with the base-bias determining resistors 123 and 125) of the charging current for capacitor 145.

The jumpers 32 and 134 provide a convenient way to alter the count provided by the FIGURE 4 circuits. In a particular contemplated example of count alteration: (a) the resistance values of the resistors of the first stage are so proportioned that removal of jumper 32 (taking resistor 31A out of the circuit) decreases the capacitor 45 discharging current to an extent sufficient to raise the count provided by the first stage from 3 to 5; and (b) the resistance values of the resistors of the second stage are so proportioned that removal of jumper 134 (taking resistor 133A out of circuit) decreases the capacitor 145 charging current to an extent sufficient to lower the count provided by the second stage from 7 to 5. Thus, with both jumpers removed, the overall frequency division ratio of the divider chain of FIGURE 4 is altered to 625 (5×5×5×5). If the input pulse repetition rate is also slightly altered to 31.25 kc., the apparatus of FIGURE 4, by the noted simple transformation, becomes suitable for use as the frequency divider chain of a generator of synchronizing signals for a television system standardized on the basis of 625 line pictures with a 50 cycle field rate. It should be noted that in such use, no alteration of the third and fourth counter stages is required, even though the frequency of the input impulses applied to each is significantly changed (i.e., changed from 1.5 kc. to 1.25 kc. for the former, and from 300 c.p.s. to 250 c.p.s. for the latter); reliance is placed on the ability of the counter circuits embodying the principles of the present invention to maintain a selected count in the face of significant change in input frequency, as previously discussed in connection with FIGURE 3.

The manner of providing count alteration described above is demonstrative of a significant operating principle of the described counter circuits: the particular count provided by a given counter stage of the form shown is essentially determined by the ratio of charging circuit current to discharge circuit current. To obtain a count of *n*, this ratio should have a value less than $n-1$ but greater than $n-2$. When the ratio is established within this range (preferably approximately midway), the circuit will maintain the desired count of *n* in the face of virtually all likely parameter variations. Essentially, the only variable directly affecting this ratio, and hence the number of the count provided, in the embodiments shown is the resistance value of resistors, a parameter normally subject to being readily held within close tolerances.

A particular set of values for the circuit elements of FIGURE 4, found to provide satisfactory circuit operation, is set forth below, by way of example only:

| | | |
|---|---|---|
| Capacitor **35** | μμf. | 3600 |
| Capacitor **45** | μf. | .047 |
| Capacitors **61**, **63** (each) | μμf. | 820 |
| Capacitors **65**, **165**, **265**, **365** (each) | μf. | 10 |
| Capacitors **135**, **235** (each) | μμf. | 2200 |
| Capacitor **145** | μf. | .39 |
| Capacitor **161** | μμf. | 470 |
| Capacitor **163** | μμf. | 560 |
| Capacitor **245** | μf. | 1.0 |
| Capacitors **261**, **361** (each) | μμf. | 360 |
| Capacitors **263**, **363** (each) | μμf. | 270 |
| Capacitor **335** | μμf. | 1300 |
| Capacitor **345** | μf. | 3.5 |
| Resistors **21**, **121**, **221**, **321** (each) | ohms | 43,000 |
| Resistors **23**, **123**, **223**, **323** (each) | do. | 2000 |
| Resistors **25**, **125**, **225**, **325** (each) | do. | 1000 |
| Resistors **31**, **31A** (each) | do. | 4750 |
| Resistor **33** | do. | 750 |
| Resistors **41**, **241**, **341** (each) | do. | 1000 |
| Resistors **43**, **143**, **243**, **343** (each) | do. | 2000 |
| Resistors **67**, **267**, **367** (each) | do. | 100 |
| Resistor **131** | do. | 3920 |
| Resistor **133** | do. | 634 |
| Resistor **133A** | do. | 2000 |
| Resistor **141** | do. | 1210 |
| Resistor **167** | do. | 51 |
| Resistor **231** | do. | 5110 |
| Resistor **233** | do. | 866 |
| Resistor **331** | do. | 8250 |
| Resistor **333** | do. | 1470 |
| Resistor **371** | do. | 2200 |
| Inductors **69**, **169**, **269**, **369** | mh. | 6 |
| Diodes **40**, **140**, **240**, **340** (each) | | Type 1N96 |
| Diodes **50**, **150**, **250**, **350** (each) | | Type 1N96 |
| Transistors **20**, **120**, **220**, **320** (each) | | Type 2N404 |
| Transistors **30**, **130**, **230**, **330** (each) | | Type 2N404 |
| Transistor **370** | | Type 2N1090 |

What is claimed is:

1. A counter circuit for providing a count of *n*, comprising in combination:

a capacitor;

means for initiating the charging of said capacitor in response to the appearance of an initial one of a periodic train of input pulses;

means for terminating said charging of said capacitor in response to the appearance of the input pulse of said train next succeeding said initial one; and means for discharging said capacitor for a period commencing with said charge termination and concluding at a time intermediate the times of appearance of a pair of successive input pulses of said train, the duration of said discharging period exceeding $(n-2)$ times the duration of the recurrence period of said input pulse train, and being less than $(n-1)$ times the duration of said recurrence period.

2. A counter circuit for providing a count of *n*, comprising in combination:

a capacitor;

means for initiating the charging of said capacitor in response to the appearance of an initial one of a periodic train of input pulses, said initiating means including a first transistor rendered conducting in response to said pulse appearance and serving to complete a charging path for said capacitor;

means for terminating said charging of said capacitor in response to the appearance of the input pulse of said train next succeeding said initial one, said terminating means including means for rendering said first transistor nonconducting in response to said appearance of said next succeeding pulse;

and means for discharging said capacitor for a period commencing with said charge termination and concluding at a time intermediate the times of appearance of a pair of successive input pulses of said train, the duration of said discharging period exceeding $(n-2)$ times the duration of the recurrence period of said input pulse train, and being less than $(n-1)$ times the duration of said recurrence period;

said discharging means including a second transistor rendered conducting in response to said rendering of said first transistor nonconducting and having a base-emitter path included in a discharging circuit for said capacitor.

3. A counter circuit for use with a source of triggering impulses, said counter circuit comprising the combination of:

a first transistor having base, emitter and collector electrodes, and biased to be normally conducting;

a second transistor having base, emitter and collector electrodes;

means including a connection from the collector electrode of said first transistor to the base electrode of said second transistor for rendering said second transistor nonconducting when said first transistor is conducting and for permitting said second transistor to conduct when said first transistor is not conducting;

a capacitor coupled between the collector electrode of said second transistor and the base electrode of said first transistor;

means including a first diode for applying impulses from said source to said base electrode of said first transistor via said capacitor, said applying means being disabled when said first diode is nonconducting;

means for biasing said first diode to be normally conducting;

a second diode shunted across the base-emitter path of said first transistor with a poling opposite the poling of said base-emitter path, said poling of said base-emitter path being such that application of said triggering impulses to said first transistor base electrode inhibits conduction in said first transistor;

and means for applying triggering impulses from said source to said base electrode of said second transistor with a conduction-inhibiting polarity.

4. A counter circuit for providing a count of *n*, comprising in combination:

a capacitor provided with a charge subject to alteration;

means for initiating the alteration of charge on said capacitor in a first direction in response to the appearance of one of a periodic train of input pulses;

means for terminating said charge alteration in said first direction and for initiating alteration of the charge on said capacitor in a direction opposite to said first direction in response to the appearance of the input pulse of said train next succeeding the pulse actuating said first-named means;

and means for terminating said charge alteration in said opposite direction at a time prior to the appearance of the $(n)$th one of the pulses of said train that follow the pulse actuating said first-named means, but subsequent to the appearance of the pulse of said train immediately preceding said $(n)$th one.

5. A counter circuit for providing a count of *n* comprising in combination:

a capacitor provided with a charge subject to alteration;

means for initiating the alteration of charge on said capacitor in a first direction in response to the appearance of one of a periodic train of input pulses;

means for terminating said charge alteration in said first direction and for initiating alteration of the charge on said capacitor in a direction opposite to said first direction in response to the appearance of the input pulse of said train next succeeding the pulse actuating said first-named means;

means for terminating said charge alteration in said opposite direction at a time prior to the appearance of the $(n)$th one of the pulses of said train that follow the pulse actuating said first-named means, but subsequent to the appearance of the pulse of said train immediately preceding said $(n)$th one;

and means for holding the charge on said capacitor substantially constant subsequent to actuation of said last-named means and until the appearance of said $(n)$th one of the pulses of said train that follow said actuating pulse, said first-named means responding to said $(n)$th one of the pulses of said train that follow said actuating pulse in the same manner as it responds to said actuating pulse.

6. A counter circuit for use with a source of triggering impulses, said counter circuit comprising the combination of:

a first transistor having base, emitter and collector electrodes, and biased to be normally conducting;

a second transistor having base, emitter and collector electrodes;

means including a connection from the collector electrode of said first transistor to the base electrode of said second transistor for rendering said second transistor nonconducting when said first transistor is conducting and for permitting said second transistor to conduct when said first transistor is not conducting;

a capacitor coupled between the collector electrode of said second transistor and the base electrode of said first transistor;

means including a first diode for applying impulses from said source to said base electrode of said first transistor via said capacitor, said applying means being disabled when said first diode is nonconducting;

means for biasing said first diode to be normally conducting;

a second diode shunted across the base-emitter path of said first transistor with a poling opposite the poling of said base-emitter path, said poling of said base-emitter path being such that application of said triggering impulses to said first transistor base electrode inhibits conduction in said first transistor;

means for applying triggering impulses from said source to said base electrode of said second transistor with a conduction-inhibiting polarity;

means including a first resistor connected to the collector electrode of said second transistor and a second resistor connected to the emitter electrode of said second transistor for connecting said electrodes of said second transistor to respective direct current supply terminals of relatively opposing polarity;

said capacitor being charged in a first direction when said first transistor is nonconducting via a charging path including said second diode, said second resistor and the emitter-collector path of said second transistor;

the charge on said capacitor being altered in a direction opposite to said first direction when said first transistor is conducting by a discharging current flowing through said first resistor and the base-emitter path of said first transistor.

7. A counter circuit for use with a source of triggering impulses, said counter circuit comprising the combination of:

a first transistor having base, emitter and collector electrodes, and biased to be normally conducting;

a second transistor having base, emitter and collector electrodes;

means including a connection from the collector electrode of said first transistor to the base electrode of said second transistor for rendering said second transistor nonconducting when said first transistor is conducting and for permitting said second transistor to conduct when said first transistor is not conducting;

a capacitor coupled between the collector electrode of said second transistor and the base electrode of said first transistor;

means including a first diode for applying impulses from said source to said base electrode of said first transistor via said capacitor, said applying means being disabled when said first diode is nonconducting;

means for biasing said first diode to be normally conducting;

a second diode shunted across the base-emitter path of said first transistor with a poling opposite the poling of said base-emitter path, said poling of said base-emitter path being such that application of said triggering impulses to said first transistor base electrode inhibits conduction in said first transistor;

means for applying triggering impulses from said source to said base electrode of said second transitor with a conduction-inhibiting polarity;

means including a first resistor connected to the collector electrode of said second transistor and a second resistor connected to the emitter electrode of said second transistor for connecting said electrodes of said second transistor to respective direct current supply terminals of relatively opposing polarity;

said capacitor being charged in a first direction when said first transistor is nonconducting via a charging path including said second diode, said second resistor and the emitter-collector path of said second transistor;

the charge on said capacitor being altered in a direction opposite to said first direction when said first transistor is conducting by a discharging current flowing through said first resistor and the base-emitter path of said first transistor;

said counter circuit providing a count of $n$ when the values of said first and second resistors are so proportioned that the magnitude of the current flowing in said charging path is greater than $(n-2)$ times the magnitude of said discharging current but less than $(n-1)$ times said discharging current magnitude.

References Cited

UNITED STATES PATENTS

| | | | |
|---|---|---|---|
| 3,113,221 | 12/1965 | Okuda | 307—88.5 |
| 3,194,977 | 7/1965 | Anzalone et al. | 307—88.5 |
| 3,202,938 | 8/1965 | Eklov | 307—88.5 |

JOHN S. HEYMAN, *Primary Examiner.*

ARTHUR GAUSS, *Examiner.*